(12) United States Patent
Sukhman et al.

(10) Patent No.: US 8,603,217 B2
(45) Date of Patent: Dec. 10, 2013

(54) RECIRCULATING FILTRATION SYSTEMS FOR MATERIAL PROCESSING SYSTEMS AND ASSOCIATED METHODS OF USE AND MANUFACTURE

(75) Inventors: Yefim P. Sukhman, Scottsdale, AZ (US); Christian J. Risser, Scottsdale, AZ (US); Nathan H. Schuknecht, Lake Forest Park, WA (US); James W. Rabideau, Fountain Hills, AZ (US); Joseph T. Hillman, Chandler, AZ (US)

(73) Assignee: Universal Laser Systems, Inc., Scottsdale, AZ (US)

( * ) Notice: Subject to any disclaimer, the term of this patent is extended or adjusted under 35 U.S.C. 154(b) by 30 days.

(21) Appl. No.: 13/019,239

(22) Filed: Feb. 1, 2011

(65) Prior Publication Data

US 2012/0192718 A1    Aug. 2, 2012

(51) Int. Cl.
*B01D 46/00*    (2006.01)

(52) U.S. Cl.
USPC .................... 95/8; 55/338; 55/340; 55/385.2; 55/467; 95/273; 96/417

(58) Field of Classification Search
USPC ............ 55/385.2, 473, 467; 96/224; 454/187, 454/255, 238, 340, 225.01, 230, 239, 259, 454/191
See application file for complete search history.

(56) References Cited

U.S. PATENT DOCUMENTS

| | | | |
|---|---|---|---|
| 4,543,484 A | 9/1985 | Meyerand, Jr. et al. | |
| 4,676,144 A * | 6/1987 | Smith, III | 454/187 |
| 4,826,513 A | 5/1989 | Stackhouse et al. | |
| 4,923,352 A * | 5/1990 | Tamura et al. | 414/225.01 |
| 4,986,839 A | 1/1991 | Wertz et al. | |
| 5,048,032 A | 9/1991 | Ekstrand et al. | |
| 5,051,558 A | 9/1991 | Sukhman | |
| 5,099,751 A * | 3/1992 | Newman et al. | 454/238 |
| 5,425,793 A * | 6/1995 | Mori et al. | 55/385.2 |
| 5,536,298 A * | 7/1996 | Awaji | 95/35 |
| 5,828,572 A * | 10/1998 | Hasegawa et al. | 700/117 |
| 5,906,760 A | 5/1999 | Robb et al. | |
| 5,922,225 A | 7/1999 | Blake | |
| 5,972,060 A * | 10/1999 | O'Halloran et al. | 55/385.2 |
| 6,191,382 B1 | 2/2001 | Damikolas | |
| 6,616,898 B2 | 9/2003 | Hara et al. | |
| 6,692,348 B1 * | 2/2004 | Cauthorne | 454/230 |
| 6,720,522 B2 | 4/2004 | Ikegami et al. | |
| 6,984,362 B2 | 1/2006 | Hara et al. | |
| 7,110,425 B2 | 9/2006 | Yamanaka et al. | |
| 7,625,277 B2 * | 12/2009 | Palmer | 454/255 |
| 8,087,980 B2 * | 1/2012 | Palmer | 454/255 |
| 2006/0088073 A1 | 4/2006 | Maas | |

(Continued)

*Primary Examiner* — Duane Smith
*Assistant Examiner* — Minh-Chau Pham
(74) *Attorney, Agent, or Firm* — Perkins Coie LLP

(57) ABSTRACT

Embodiments of recirculating filtration and exhaust systems for material processing systems are disclosed herein. A material processing system configured in accordance with one embodiment includes an enclosure for processing a workpiece, the enclosure having an enclosure inlet and an enclosure outlet. The system also includes a first flow path fluidly coupled to the enclosure inlet and the enclosure outlet, and a first filtration assembly in the first flow path. The first filtration assembly draws airflow from the enclosure and returns the airflow to the enclosure. The system further includes a second flow path in fluid communication with the first flow path upstream from the enclosure inlet, and a second filtration assembly in the second flow path. The second filtration assembly draws airflow from the first flow path and returns airflow to the first flow path.

25 Claims, 2 Drawing Sheets

(56) References Cited

U.S. PATENT DOCUMENTS

| | | |
|---|---|---|
| 2006/0117722 A1* | 6/2006 | Kuo et al. ............... 55/385.2 |
| 2006/0199519 A1 | 9/2006 | Lai |
| 2007/0030875 A1 | 2/2007 | Takazane et al. |
| 2007/0062167 A1* | 3/2007 | Olander et al. ............ 55/385.2 |
| 2007/0119131 A1* | 5/2007 | Nakano et al. ............. 55/385.2 |
| 2009/0081108 A1* | 3/2009 | Sakai et al. ................ 423/350 |
| 2009/0223944 A1 | 9/2009 | Sukhman et al. |
| 2010/0112926 A1* | 5/2010 | Ozeki ......................... 454/187 |

* cited by examiner

RECIRCULATING FILTRATION SYSTEMS FOR MATERIAL PROCESSING SYSTEMS AND ASSOCIATED METHODS OF USE AND MANUFACTURE

TECHNICAL FIELD

The present disclosure is directed generally to material processing systems and, more specifically, to recirculating filtration systems for material processing systems.

BACKGROUND

Lasers are frequently used for testing, measuring, printing, cutting, marking, medical applications, communications, data transmission, semiconductor processing, and a number of other applications. Many types of lasers have been developed to meet performance criteria for specific applications. For example, engraving, cutting, marking, printing, and many other applications require relatively compact lasers that generate high power outputs and have beams with a desired shape and energy distribution. Such laser-based processing systems can mark, cut, weld, or perform other types of surface modifications to materials for a variety of applications.

When the focused laser beam irradiates the surface of a target material (i.e., wood, plastic, leather, coated metals, etc.), the irradiation can create contaminants such as fumes, particulates, smoke, debris, etc. If these contaminants are not evacuated from the material processing site, they can negatively affect and/or damage the optical components and motion system components of the laser system. Accordingly, it is beneficial to extract such contaminants from the material processing site. Certain conventional systems vent the contaminants away from the processing area, while other conventional systems filter the contaminants from the air to prevent damage to the system, as well as to prevent exposure to the system operator or other bystanders.

DETAILED DESCRIPTION

Figure 1:
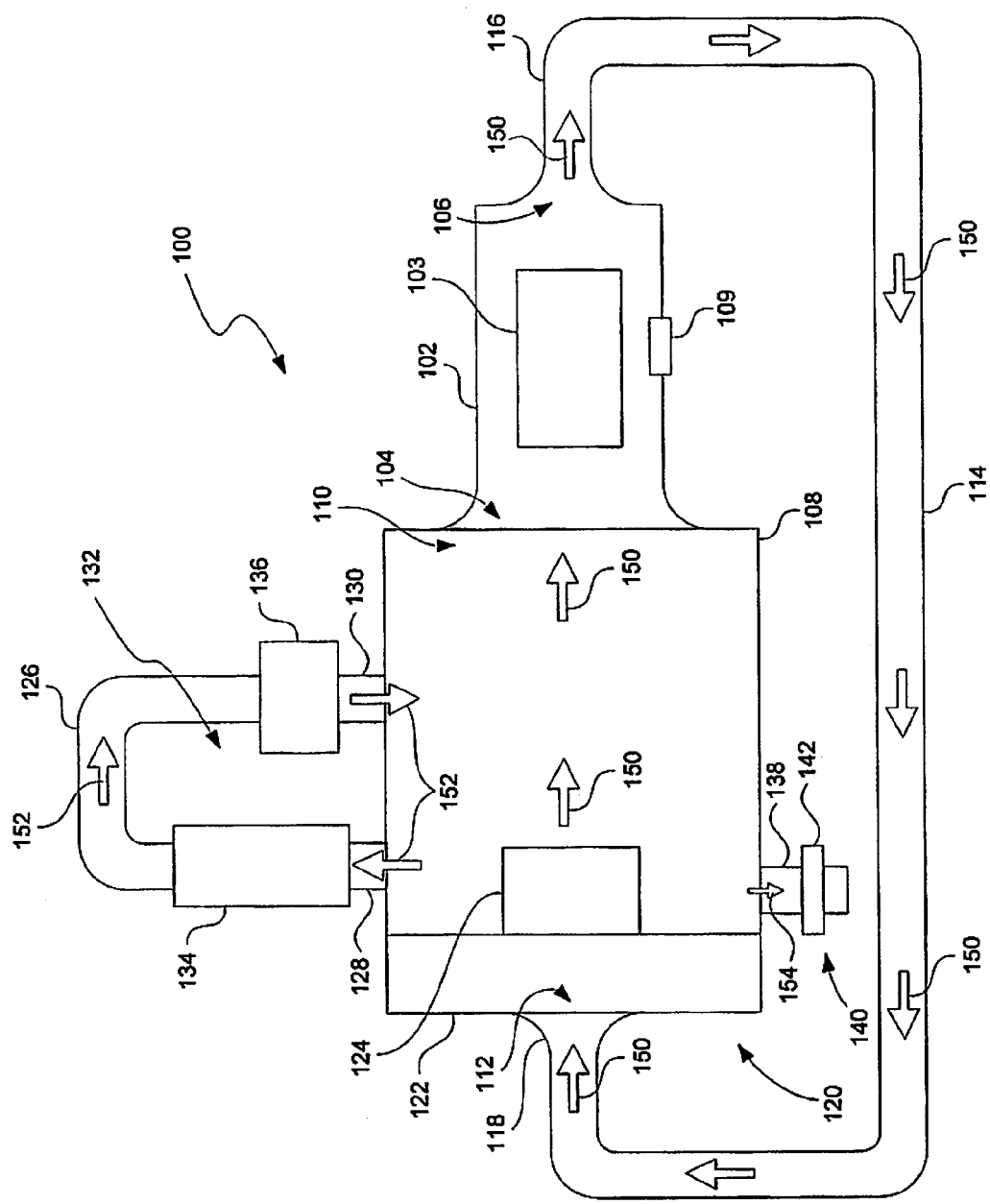
FIG. 1 is a schematic plan view of a material processing system configured in accordance with an embodiment of the disclosure.

The following disclosure describes various embodiments of systems and methods for exhausting material processing systems, including for example laser-based material processing systems, and associated assemblies and methods of use and manufacture. In one embodiment, a material processing system includes a closed exhaust loop having a first or primary exhaust loop portion fluidly coupled to a second exhaust loop portion. The first exhaust loop portion includes a first air cleaner and a first air mover that exhausts airflow from a material processing chamber, removes particulates from the air flow, and returns the airflow to the material processing chamber. The second loop portion includes a second air cleaner and a second air mover that draws off a portion of the airflow from the first exhaust loop portion upstream from the material processing chamber, removes fumes from the portion of the air flow, and returns the portion of the airflow to the first exhaust loop portion upstream from the material processing chamber.

In another embodiment, a laser-based material processing system includes a processing chamber for processing a work piece with a laser. The processing chamber has a processing chamber inlet and a processing chamber outlet. The system also includes an exhaust chamber fluidly coupled to the processing chamber inlet. The exhaust chamber has an exhaust chamber inlet, and the system further includes a first exhaust line fluidly coupling the processing chamber outlet to the exhaust chamber inlet. The system further includes a first air cleaner proximate to the exhaust chamber inlet, and a first exhaust blower in line with the first air cleaner. The system also includes a second exhaust line having a first end portion and a second end portion, with each of the first and second end portions being fluidly coupled to the exhaust chamber upstream from the processing chamber inlet. The system further includes a second air cleaner in the second exhaust line and a second exhaust blower in line with the second air cleaner in the second exhaust line.

Certain details are set forth in the following description and in FIGS. 1 and 2 to provide a thorough understanding of various embodiments of the disclosure. Other details describing well-known structures and systems often associated with processing systems, exhaust systems, and methods for forming and using such systems, are not set forth in the following disclosure to avoid unnecessarily obscuring the description of the various embodiments of the disclosure.

Many of the details, dimensions, angles and/or other portions shown in the Figures are merely illustrative of particular embodiments of the disclosure and may be schematically illustrated. As such, the schematic illustration of the features shown in the Figures is not intended to limit any structural features or configurations of the processing systems disclosed herein. Accordingly, other embodiments can have other details, dimensions, angles and/or portions without departing from the spirit or scope of the present disclosure. In addition, further embodiments of the disclosure may be practiced without several of the details described below, while still other embodiments of the disclosure may be practiced with additional details and/or portions.

FIG. 1 is a schematic plan view of a material processing system 100 ("system 100") configured in accordance with an embodiment of the disclosure. In the illustrated embodiment, the system 100 includes a material processing enclosure or chamber 102 that is fluidly coupled to an exhaust enclosure or chamber 108. The material processing chamber 102 at least partially houses a material processing assembly 103, such as a laser assembly, that can be used for processing or irradiating a target material (i.e., wood, plastic, leather, coated materials, etc.). The material processing assembly 103 can include any processing tools suitable for processing various target materials. For example, in certain embodiments the material processing assembly 103 can include any of a variety of radiation or other material processing tools or methods known in the art. These may include, for example, welding, soldering, printing, plasma cutting, sintering, a gas laser, a solid-state laser, a semiconductor laser, a dye laser, a fiber laser, or any combination of these. As will be appreciated by one of ordinary skill in the art, for laser-based material processing systems the nature of the laser or material processing source depends upon the intended application. For example, in systems 100 used for material marking, the material processing assembly 103 can be a carbon dioxide gas laser or an Nd:YAG laser. In still further embodiments, the system 100 can include more than one material processing assembly 103.

As explained in detail below, the system 100 also includes multiple exhaust assemblies that are configured to exhaust fumes, particulates, smoke, debris, etc. (referred to herein collectively as "contaminants") generated in the material processing chamber 102 by the material processing assembly 103. These exhaust assemblies can be configured to (a) supply airflow (e.g., laminar air flow) across a portion of the material processing chamber 102, (b) draw contaminants out of the material processing chamber 102, and (c) remove contaminants (e.g., particulate matter, fumes, etc.) from the exhaust air flow. Moreover, these multiple exhaust assemblies can effectively generate the exhaust airflow and clean or filter the exhaust airflow in a closed loop configuration requiring little to no fresh air intake or bleeding of air from the system.

In the illustrated embodiment, the material processing chamber 102 includes an inlet 104 and an outlet 106, and the exhaust chamber also includes an inlet 112 and an outlet 110. The exhaust chamber outlet 110 is fluidly coupled to the material processing chamber inlet 104. A first exhaust conduit or line 114 can fluidly couple the material processing chamber outlet 106 to the exhaust chamber inlet 112. More specifically, the first exhaust line 114 includes a first end portion 116 that is coupled to the processing chamber outlet 106, and a second end portion 118 that is coupled to the exhaust chamber inlet 112. Accordingly, the system 100 includes a first exhaust or airflow path 150 (indicated by multiple arrows 150) that flows from the material processing chamber 102 to the exhaust chamber 108 and returns to the material processing chamber 102. In certain embodiments, the first exhaust line 114 can be omitted from the system 100 and the airflow can travel between the material processing chamber 102 and the exhaust chamber 108 as a result of the direct attachment of the material processing chamber 102 to the exhaust chamber 108. For example, exhaust airflow can travel along the first airflow path 150 directly from the processing chamber 102 to the exhaust chamber 108 without passing through a conduit or separate exhaust line. In still further embodiments, the system 100 can be substantially hermetically sealed such that first airflow path 150 is a closed loop airflow path. For example, the components of the system 100 can be sealed or otherwise configured such that all, or substantially all, of the airflow in the system 100 stays within the system 100 without a fresh air intake or bleeding air from the system 100. In other embodiments, however, and as explained in detail below, small amounts of airflow can enter and/or be bled from the system 100.

The system 100 further includes a first exhaust assembly 120 at or proximate to the inlet 112 of the exhaust chamber 108. The first exhaust assembly 120 can include a first air cleaner or filter 122 in line (e.g., upstream or downstream) from a first air mover or blower 124. The first blower 124 is configured to induce the exhaust airflow and associated contaminants from the material processing chamber 102 through the first airflow path 150 at a first flow rate. In certain embodiments, the first filter 122 can be a particulate filter that removes particulate matter from the airflow in the first airflow path 150. For example, the first filter 122 can include a porous medium, such as a relatively thin membrane, that captures particulate matter from the airflow passing through the first filter 122. The first filter 122 can include any suitable particulate filter, including for example, multiple layers or stages of porous media with progressively smaller pore sizes, such as pre-filters and HEPA filters. In certain embodiments, the first filter 122 can remove substantially all particulates from the airflow down to a predetermined particulate size, such as 0.30 micron, for example. In other embodiments, however, the first filter 122 can remove particulate matter of a greater or smaller size. In still further embodiments, the first filter 122 can include multiple separate particle filters in series and/or other types of suitable air filters.

According to additional features of the illustrated embodiment, the system 100 also includes a second exhaust conduit or line 126 fluidly coupled to the exhaust chamber 108. The second exhaust line 126 includes a first end portion 128 coupled to the exhaust chamber 108 and a second end portion 130 coupled to the exhaust chamber 108, each at a location that is upstream from the material processing chamber inlet 104. In certain embodiments, each of the first and second end portions 128, 130 of the second exhaust line 126 can be fluidly coupled to the exhaust chamber 108 at a location downstream from the first filter 122. In other embodiments, however, the second end portion 130 can be fluidly coupled to the exhaust chamber 108 or the first exhaust line 114 at a location upstream from the first exhaust assembly 120 such that the second exhaust line 126 returns air flow to the first airflow path 150 at a location upstream from the first filter 122. As shown in the illustrated embodiment, the system 100 includes a second exhaust or airflow path 152 (indicated by multiple arrows 152) that flows from the exhaust chamber 108 through the second exhaust line 126 and returns to the first airflow path 150. Air flowing through the second airflow path 152 is drawn from the first airflow path 150 in the exhaust chamber 108 downstream from the first filter 122 and returned to the exhaust chamber 108 or the first exhaust line 114 upstream from the exhaust chamber outlet 110. In this manner, airflow from the exhaust chamber 108 can repeatedly cycle through the second exhaust line 126 to filter or otherwise clean the air in the second airflow path 152 as described in detail below. In certain embodiments, the second exhaust line 126 can be omitted from the system 100 and the airflow can travel along the second airflow path 152 within the exhaust chamber 108.

The system 100 further includes a second exhaust assembly 132 positioned in line with the second exhaust line 126. The second exhaust assembly 132 draws airflow from the exhaust chamber 108 along the second airflow path 152. More specifically, the second exhaust assembly 132 includes a second air mover or blower 136 that draws the airflow through a second air cleaner or filter 134. Although the second blower 136 is illustrated in FIG. 1 at a location downstream from the second filter 134, one of ordinary skill in the art will appreciate that the second blower 136 can also be positioned upstream from the second filter 134. As explained in detail below, the second blower 136 can move the airflow through the second airflow path 152 at a second flow rate that can be independent and/or different than the first flow rate attributed to the first blower 124 in order to optimize second flow rate for the second filter 134 independent from the first flow rate. For example, in one embodiment the second flow rate can be less than the first flow rate. In other embodiments, however, the second flow rate can be equal to or greater than the first flow rate. Moreover, in certain embodiments the second filter 134 can be a fume filter configured to capture volatile or noxious fumes or molecular components that are smaller than particulates carried in the exhaust air moving through the assembly 100. For example, the second filter 134 can utilize carbon adsorption, catalytic processes, scrubbers, and/or fluid bubbler baths to remove fumes from the airflow passing through the second filter 134. Although the second filter 134 is shown in FIG. 1 as being spaced apart from the second blower 136, and the first filter 122 is shown as being generally adjacent to the first blower 124, one of ordinary skill in the art will appreciate that the system 100 shown in FIG. 1 is a schematic representation of these components and that these components can be positioned at other locations relative to one another (e.g., spaced apart from one another, adjacent to one another, etc.).

In certain embodiments the system 100 can be a hermetically sealed system such that a fresh air intake or make-up air intake is not required during operation. In other embodiments, however, one or more pressurized portions of the system 100 may not be completely sealed such that small amounts of air enter or otherwise leak into the system 100. In such embodiments, and as shown in FIG. 1, the system 100 can include one or more airflow relief or bleed assemblies 140. The illustrated bleed assembly 140 includes an exit, bleed line or conduit 138 that is fluidly coupled to the exhaust chamber 108 downstream from the first exhaust assembly 120. The bleed line 138 provides an exit or bleed airflow path 154 for airflow to selectively exit the exhaust chamber 108 to an external environment outside of the system 100. For example, the bleed assembly 140 is configured to release a volume of air that is generally equivalent to the volume of air entering or leaking into the system 100. In this manner, the bleed line assembly 140 can maintain one or more negative pressures in portions of the system 100 (e.g., in the material processing chamber 102) without the need for air tight seals. The bleed assembly 140 can further include a third filter 142 positioned in line with the bleed line 138. In certain embodiments, the third filter 142 can be generally similar to the second filter 134 and configured to remove fumes from air flowing along the bleed flow path 154 out of the exhaust chamber 108. As such, the third filter 142 can remove any residual fumes or other contaminants from airflow in the bleed airflow path 154 so that contaminants are at an acceptable level before it is exhausted outside the system 100. Additionally, in certain embodiments the bleed assembly 140 may be positioned in the second exhaust assembly 132, either before or after each of the second filter 134 and the second blower 136.

In still further embodiments, the system 100 can include one or more sensors positioned within the system 100 to monitor the level of contaminant in the air flowing through the system 100. For example, the system 100 can include one or more sensors in the material processing chamber 102, the exhaust chamber 108, and/or the first, second, and third exhaust lines 114, 126, 138 to detect contaminant levels in any of the first, second, and/or third airflow paths 150, 152, 154. In certain embodiments, the system 100 can include a fume sensor to monitor fume levels in any of the first, second, and/or third airflow paths 150, 152, 154. A fume sensor can accordingly detect unacceptable levels of fumes in the air flow, as well as provide an indication to replace any of the fume filters in the system 100 (e.g., the second filter 134 and/or the third filter 142). In other embodiments, the system 100 can also include one or more pressure sensors to detect or monitor a pressure differential across the first filter 122 to provide an indication to replace the first filter 122 when the pressure differential reaches an unacceptable level.

According to yet another feature of the illustrated embodiment, the exhaust chamber 108 can be sized to be larger than the material processing chamber 102 for the purpose of creating a profiled airflow through the material processing chamber 102 along the first airflow path 150. More specifically, the exhaust chamber 108 can have a first cross-sectional area or cross section that tapers into a smaller second cross-sectional area or cross section of the material processing chamber 102. Airflow passing through the first exhaust assembly 120 is accordingly vented into the relatively larger cross section of the exhaust chamber 108 before passing into the relatively smaller cross section of the material processing chamber 102.

In certain embodiments, the ratio of the cross section in the exhaust chamber 108 to the cross section in the material processing chamber 102 can be determined or optimized using Bernoulli's flow equations. This can ensure that the pressure drop from the changing cross sections provides for a slight negative pressure within the material processing chamber 102 with respect to ambient pressure external to the system 100. This slight negative pressure can help to avoid positive relative pressure leaks in the material processing chamber 102. For example, keeping the material processing chamber 102 under negative pressure can help to remove all noxious fumes and other contaminants from the material processing chamber 102. Any pressure above atmospheric in the material processing chamber 102 could cause unfiltered fumes to escape from leaks in the material processing chamber 102. In other embodiments, however, areas in the system 100 of the recirculating airflow that are above atmospheric pressure can be sealed to maintain the negative pressure in the material processing chamber 102.

To create a desired negative pressure or vacuum in the material processing chamber 102, Bernoulli's equations can be used to calculate suitable required cross sections for the material processing chamber 102 and the exhaust chamber 108. For example, starting with known, desired characteristics of one of these chambers, as well as known initial exhaust blower pressure from the first exhaust assembly 120, the cross-sectional area of corresponding chamber can be calculated for optimal performance. More specifically, Bernoulli's equation can be expressed as shown below in equation (1):

$$\frac{P_1}{\rho} + \frac{1}{2}V_1^2 gz_1 = \frac{P_2}{\rho} + \frac{1}{2}V_2^2 gz_2 \qquad (1)$$

where $P_1$ refers to a first pressure in the exhaust chamber 108, $\rho$ refers to the density of the air in the system 100, $V_1$ refers to a first velocity of the airflow in the exhaust chamber 108, g refers to the acceleration due to gravity, and $z_1$ refers to a first elevation of the exhaust combustion chamber 108. Moreover, $P_2$ refers to a second pressure in the material processing chamber 102, $V_2$ refers to a second velocity of the airflow in the material processing chamber 102, and $z_2$ refers to a second elevation of the material processing chamber 102. According to conservation of energy and mass principles, the mass balance of the system 100 can be expressed as shown below in equation (2):

$$A_1 V_1 = A_2 V_2 \qquad (2)$$

where $A_1$ refers to a first cross-sectional area of the exhaust chamber 108, and $A_2$ refers to a second cross-sectional area of the material processing chamber 102.

Assuming that $z_1 = z_2$ and that the system 100 is a closed system such that the energy in the exhaust chamber 108 is approximately equal to the energy in the material processing chamber 102 (e.g., $Q_1 = Q_2$), equations (1) and (2) reduce to equation (3) as shown below:

$$A_1 = \frac{A_2 V_2}{\sqrt{V_2^2 + \frac{2(P_2 - P_1)}{\rho}}} \qquad (3)$$

Accordingly, the second cross-sectional area $A_2$ of the exhaust chamber 108 (or conversely the first cross-sectional area $A_1$ of the material processing chamber 102) can be determined, as well as the first velocity $V_1$ (or conversely the second velocity $V_2$) when the other properties in Equation (3) are known. By way of illustration, in one embodiment, for example, assuming that $P_1$ is approximately 1 inch of water, $A_2$ is approximately 72 square inches (e.g., 3 inches by 24 inches in one embodiment), $P_2$ is approximately negative 0.1 inch of water, $V_2$ is approximately 260 inches per second, and $\rho$ is approximately 0.031 slugs per cubit foot, $A_1$ is calculated as 158 square inches, and $V_1$ is calculated as 118 inches per second. Moreover, in the embodiment where the first cross-sectional area $A_1$ is 158 square inches, the exhaust chamber can have dimensions of approximately 6.58 inches by 24 inches. One of ordinary skill in the art will appreciate, however, the dimensions and other property values listed above are merely illustrative of one embodiment and are used for the purpose of illustrating the determination of the corresponding dimensions and/or property values. In other embodiments, these dimensions and property values can have different values.

According to additional aspects of the embodiment illustrated in FIG. 1, the material processing chamber 102 can further include an access door or port 109 to allow an operator to load or unload processing materials into and out of the material processing chamber 102. The access port 109 can be insulated or sealed to prevent any leaks into or out of the material processing chamber 102. Moreover, in certain embodiments, the access port 109 can include a locking mechanism to prevent access to the material processing chamber 102 until the exhaust assemblies have filtered the contaminants in the system 100, and more particularly the fumes in the air flow, to an acceptable level. In embodiments where the access port 109 includes a locking mechanism, the system 100 can further include an emergency override for the access port 109 to allow an operator to access the material processing chamber 102 in the event of an adverse operating condition (e.g., fire, errant irradiation, etc.). Moreover, the system 100 can further include a bypass valve that can direct the exhaust airflow to an external port to be vented to the outside of the building where the system 100 is in use in the event that one or more sensors indicate that the fume level is not returning to a predetermined level after a prescribed period of time.

The system 100 can further be configured to dissipate any built-up heat that may be generated in the closed loop airflow path from the exhaust assemblies that are continually compressing the same air flow. In one embodiment, for example, the sidewalls of the exhaust chamber 108 and/or the material processing chamber 102, as well as the first exhaust line 114 and/or the second exhaust line 126, can conduct or dissipate unwanted heat to the external environment. In other embodiments, the system 100 can include one or more heat exchangers or heat exchanging components (e.g., fins) to suitably dissipate heat from the closed airflow loop to the outside environment.

In operation, the system 100 provides several advantages over conventional material processing exhaust systems. For example, the airflow restriction that is created by the second filter 134 (e.g., a fume or carbon filter) is removed from the first airflow path 150. In this manner the first blower 124 is required to overcome only the airflow restriction caused by the first filter 122 (e.g., a particulate filter). Filters, by their nature, restrict air flow, thereby increasing the difficulty of maintaining sufficient airflow velocity from the material processing chamber 102. However, positioning the second filter 134 in a separate airflow path from the first filter 122 allows the first blower 124 to be a relatively small blower that can still exhaust air along the first airflow path 150 at a sufficiently high velocity from the material processing chamber 102 to remove the corresponding contaminants from the material processing chamber 102. Using a relatively smaller first blower 124 can also reduce the power consumption of the system 100.

Separating the particulate matter filter or first filter 122 from the fume filter or second filter 134 also provides several other advantages. For example, the system 100, and more specifically the first blower 124, can induce a first or higher air flow airflow velocity along the first airflow path 150 that is greater than a second or lesser air flow airflow velocity induced by the second blower 136 along the second airflow path 152. The airflow velocity along the first airflow path 150 can be greater than the airflow velocity along the second airflow path 152 since particulate filters are not sensitive to the speed of exhaust air flow, but fume filters are sensitive to the speed of exhaust air flow. The second blower 136 can be configured to produce the second or slower exhaust airflow along the second airflow path 152 through the second filter 134 (e.g., a carbon or fume filter), which accordingly allows more time for adsorption of the contaminant in the second filter 134. Since carbon filter efficiency is dependent on dwell time in the carbon media, the slower airflow velocity along the second airflow path 152 can increase the contaminant filtering by the second filter 134 without compromising the airflow velocity along the first airflow path 150, which can be relatively faster or otherwise optimized for effective contaminant removal from the material processing chamber 102.

Furthermore, when fume or carbon filters include a single pass carbon filtration scheme, the carbon in the filter must be replaced when break through of the fumes occurs. This means that part of the carbon media cross section of the filter is saturated and therefore no longer filtering, thereby allowing the fumes to pass through the filter. If this occurs, the filter media must be replaced, even if other parts of the media are not saturated. This problem is overcome, however, with the recirculating configuration of the system 100. More specifically, the fumes entrained in the air flowing along the second airflow path 152 are recirculated multiple times through the carbon media of the second filter 134, thereby allowing the carbon media of the second filter 134 to be used more efficiently and/or for longer periods until the entire media of the second filter 134 is saturated. Moreover, more carbon media can be used in the second filter 134 in the second airflow path 152 without the concern that the extra filter media will increase the airflow restriction and thereby reduce the airflow speed along the first airflow path 150.

According to additional aspects of the illustrated embodiment, carbon media in the second filter 134 may slowly outgas the fumes it has adsorbed when the exhaust air is not flowing through the system 100. In conventional open loop systems, the exhaust airflow path upstream of the carbon filter slowly builds up concentrations of these fumes which can backstreamed into the material processing chamber. The illustrated system 100, however, can compensate for these concentrations by keeping access doors or ports to the second conduit 126 closed or locked when the exhaust air is not flowing. For example, spring or gravity loaded flaps can also be used to seal off the second airflow path 152 from the first airflow path 150 when the system 100 is powered off or otherwise not operating. The system 100 can also delay access to the material processing chamber 102 at startup by activating the first and/or second blowers 124, 136 and keeping the access port 109 locked until the sensors indicate the fume levels are safe.

As noted above, according to additional features of the illustrated embodiment, the system 100 can also provide a slight negative pressure in the material processing chamber 102 so that an air tight seal is not necessary in a recirculating airflow arrangement. Conventionally, airtight seals are needed anywhere there is a negative pressure in a recirculating system. Otherwise, air will leak into the area under negative pressure and join the recirculating air flow, thereby raising the volume and pressure of air in the entire system until the area that was under negative pressure rises to atmospheric pressure and the equilibrium condition eliminates the leak. To maintain a negative pressure in the material processing chamber 102 in a recirculating exhaust configuration without the need for air tight seals, the system 100, and more specifically the air bleed assembly 140, can bleed a volume of air from the system 100 that is equal to the volume of air leaking into the system 100. As such, the bleed assembly 140 can be positioned in the pressure side of the system 100, such as at a location in the system 100 immediately after or otherwise downstream from the second blower 124. As noted above, the bleed assembly 140 can include a third fume filter 142 to filter the air in the third airflow path 154 before being exhausted outside the recirculating system 100. Embodiments of the system 100 including the bleed assembly 140 do not defeat the overall advantages of a recirculating system because the volume of bleed air that is necessary is a very small portion of the exhaust air flow, which in turn can be filtered with a small volume of filter media (e.g., carbon) in the third filter 142. As also noted above, one or more sensors can also be positioned after the third filter 142 in the third airflow path 154 to sense when the third filter 142 requires replacement. In other embodiments, however, the negative pressure portion of the recirculation path in the system 100 can be completely or hermetically sealed to eliminate the need of the bleed assembly 140.

Figure 2:
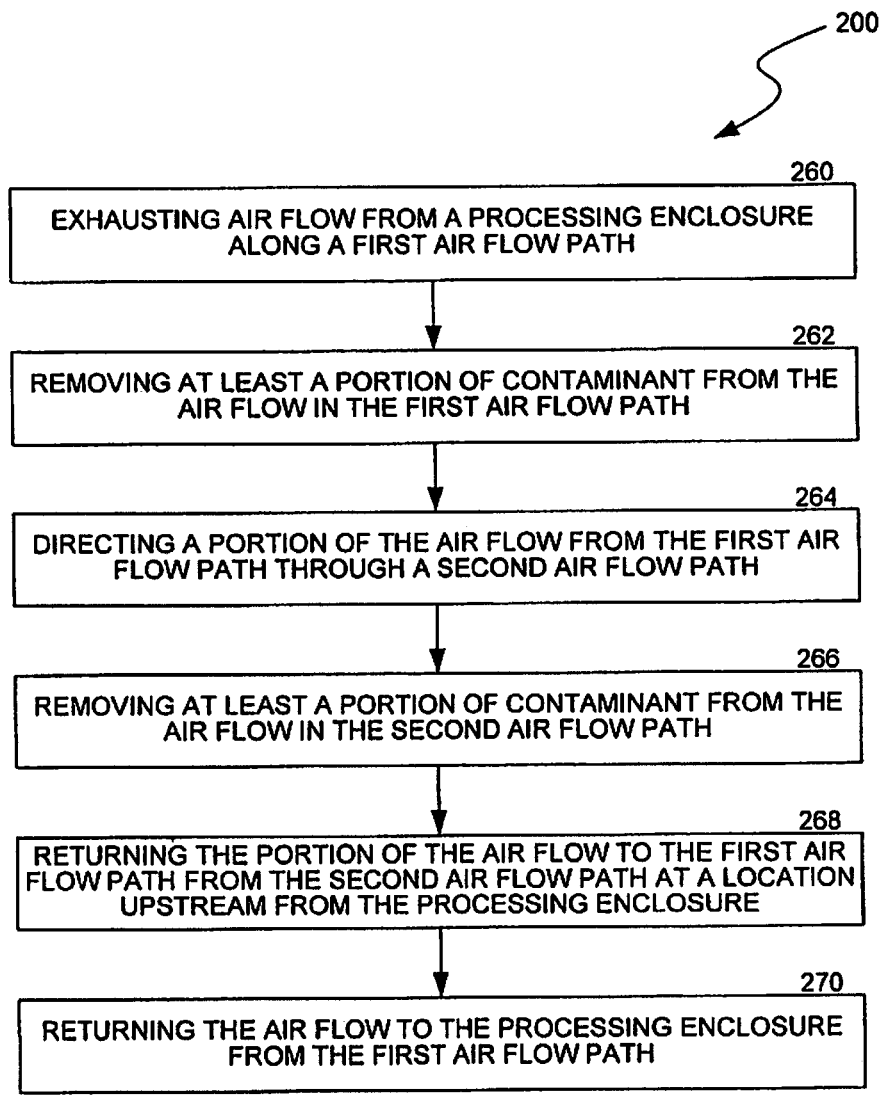
FIG. 2 is a flow diagram illustrating a method configured in accordance with an embodiment of the disclosure for exhausting a processing enclosure of a material processing system.

FIG. 2 is a flow diagram illustrating a method 200 configured in accordance with an embodiment of the disclosure for exhausting a processing enclosure of a laser-based material processing system. The method 200 can be performed, for example, using the system 100 described above with reference to FIG. 1, or using other suitable laser-based processing systems. The method 200 can include exhausting air flow from a processing enclosure along a first air flow path (block 260), and removing at least a portion of contaminant from the air flow in the first air flow path (block 262). In certain embodiments, removing at least a portion of contaminant from the air flow in the first air flow path includes removing at least a portion of particulate matter from the air flow in the first air flow path with a first air cleaner or filter assembly. Moreover, exhausting the air flow from the processing enclosure along the first air flow path can include exhausting the air flow with a first air mover at a first speed. The method 200 also includes directing a portion of the air flow from the first air flow path through a second air flow path (block 264), and removing at least a portion of contaminant from the air flow in the second air flow path (block 266). In certain embodiments, removing at least a portion of contaminant from the air flow in the second air flow path includes removing at least a portion of gaseous contaminant or fumes from the air flow in the second air flow path with a second air cleaner or filter assembly different from the first filter assembly. Moreover, directing the portion of the air flow from the first air flow path through the second air flow path can include directing the portion of the air flow with a second air mover different from the first air mover, and at a second speed that is independent or different from than the first speed. As the airflow repeatedly cycles or moves through the second air flow path, the second filter assembly can continue to remove contaminant or otherwise further clean the airflow. The method can further include returning the portion of the air flow to the first air flow path from the second air flow path at a location upstream from the processing enclosure (block 268), and returning the air flow to the processing chamber from the first air flow path (block 270). In still further embodiments, the method can include detecting or sensing a level of contaminant removal from the second air flow path downstream from the second filtration assembly.

From the foregoing, it will be appreciated that specific embodiments of the disclosure have been described herein for purposes of illustration, but that various modifications may be made without deviating from the spirit and scope of the various embodiments of the disclosure. For example, although many of features of the system are described above with reference to singular components illustrated schematically in FIG. 1, in other embodiments the system can include multiple components (e.g., multiple filters, air movers, etc.). Further, while various advantages associated with certain embodiments of the disclosure have been described above in the context of those embodiments, other embodiments may also exhibit such advantages, and not all embodiments need necessarily exhibit such advantages to fall within the scope of the disclosure.

We claim:

1. A material processing system comprising:
a processing chamber for processing a workpiece, the processing chamber having a processing chamber inlet and a processing chamber outlet;
an exhaust chamber fluidly coupled to the processing chamber inlet, the exhaust chamber having an exhaust chamber inlet;
a first exhaust line fluidly coupling the processing chamber outlet to the exhaust chamber inlet;
a first air cleaner proximate to the exhaust chamber inlet;
a first exhaust air mover in line with the first air cleaner, wherein the first exhaust air mover is a first blower configured to generate a first flow rate through the first exhaust line;
a second exhaust line having a first end portion and a second end portion, each of the first and second end portions being fluidly coupled to the exhaust chamber upstream from the processing chamber inlet;
a second air cleaner in the second exhaust line; and
a second exhaust air mover in the second exhaust line in line with the second air cleaner, wherein the second exhaust air mover is a second blower configured to generate a second flow rate through the second exhaust line, and wherein the second flow rate is different than the first flow rate,
wherein, during processing of the workpiece, the processing chamber, the exhaust chamber, the first exhaust line, and the second exhaust line are configured to form a closed loop system.

2. The system of claim 1 wherein the first air cleaner is a particulate filter and the second air cleaner is a gaseous fume filter.

3. The system of claim 2 wherein the second filter is configured to remove gaseous fume by at least one of the following processes: carbon adsorption, catalytic adsorption, fluid bubbler bath, gaseous scrubbers, and incineration.

4. The system of claim 1 wherein the exhaust chamber has a larger cross-sectional area than the processing chamber.

5. The system of claim 1 wherein the first air mover induces a negative air pressure in the processing chamber during operation.

6. The system of claim 1, further comprising a bleed valve coupled to at least one of the following: the processing chamber, the exhaust chamber, the first exhaust line, and the second exhaust line, and wherein the bleed valve is configured to allow a predetermined amount of air to exit the system.

7. The system of claim 6, further comprising a third air cleaner downstream from the bleed valve.

8. The system of claim 1 wherein the processing chamber, the exhaust chamber, the first exhaust line, and the second exhaust line are configured to be hermetically sealed.

9. The system of claim 1, further comprising a sensor in at least one of the second exhaust line and the exhaust chamber, wherein the sensor is configured to detect airflow contaminant.

10. The system of claim 1 wherein the enclosure is configured for processing including at least one of the following: laser processing, welding, soldering, printing, plasma cutting, and sintering.

11. The system of claim 1 wherein each of the first and second end portions of the second exhaust line are fluidly coupled to the exhaust chamber downstream from the first air cleaner.

12. The system of claim 1 wherein the first end portion of the second exhaust line is fluidly coupled to the exhaust chamber downstream from the first air cleaner and the second end portion of the second exhaust line is fluidly coupled to the first exhaust line upstream from the first air cleaner.

13. A material processing system comprising:
an enclosure for processing a workpiece, the enclosure having an enclosure inlet and an enclosure outlet;
a first flow path fluidly coupled to the enclosure inlet and the enclosure outlet;
a first filtration assembly in the first flow path, wherein the first filtration assembly draws airflow from the enclosure and returns the airflow to the enclosure;
a second flow path in fluid communication with the first flow path upstream from the enclosure inlet; and
a second filtration assembly in the second flow path, wherein the second filtration assembly draws airflow from the first flow path and returns airflow to the first flow path,
wherein airflow in the first flow path has a first dwell time in the first filtration assembly and airflow in the second flow path has a second dwell time in the second filtration assembly, and wherein the second dwell time is different than the first dwell time,
wherein, during processing of the workpiece, the enclosure, the first flow path, and the second flow path are configured as a closed loop system.

14. The system of claim 13 wherein the second filtration assembly is in fluid communication with the first flow path downstream from the first filtration assembly.

15. The system of claim 13 wherein:
the first filtration assembly comprises a first air cleaner in line with a first air mover; and
the second filtration assembly comprises a second air cleaner in line with a second air mover.

16. The system of claim 15 wherein the first air cleaner is a particulate filter configured to at least partially remove particulate matter from the air flow, and the second air cleaner is a fume filter configured to at least partially remove fumes from the air flow.

17. The system of claim 16 wherein the second filter further removes fumes from the airflow with each successive pass of the air flow through the second flow path.

18. The system of claim 13 wherein the enclosure is a first enclosure, and wherein the system further comprises a second enclosure coupled to the inlet of the first enclosure, wherein the first enclosure has a first area that is less than a second area of the second enclosure.

19. The system of claim 18 wherein the second flow path is fluidly coupled to the second enclosure, and wherein the second filtration assembly draws airflow from the first flow path in the second enclosure and returns airflow to the first flow path in the second enclosure.

20. A method for exhausting a processing enclosure of a laser-based material processing system, the method comprising:
exhausting airflow from the processing enclosure along a first airflow path at a first speed;
removing at least a portion of contaminant from the airflow in the first airflow path;
directing a portion of the airflow from the first airflow path through a second airflow path at a second speed different than the first speed;
removing at least a portion of contaminant from the airflow in the second airflow path;
returning the portion of the airflow to the first airflow path from the second airflow path at a location upstream from the processing enclosure; and
returning the airflow to the processing chamber from the first airflow path,
wherein, during operation, the processing enclosure, the first airflow path, and the second airflow path comprise a closed system.

21. The method of claim 20 wherein:
removing at least a portion of contaminant from the airflow in the first airflow path comprises removing at least a portion of contaminant with a first air cleaner assembly; and
removing at least a portion of contaminant from the airflow in the second airflow path comprises removing at least a portion of contaminant with a second air cleaner assembly different from the first air cleaner assembly.

22. The method of claim 20 wherein:
removing at least a portion of contaminant from the airflow in the first airflow path comprises removing at least a portion of particulate matter from the airflow in the first airflow path; and
removing at least a portion of contaminant from the airflow in the second airflow path comprises removing at least a portion of gaseous contaminant from the airflow in the second airflow path.

23. The method of claim 20 wherein:
exhausting the airflow from the processing enclosure along the first airflow path comprises exhausting the airflow with a first air mover; and
directing the portion of the airflow from the first airflow path through the second airflow path comprises directing the portion of the airflow with a second air mover different from the first air mover.

24. The method of claim 20 wherein:
exhausting the airflow from the processing enclosure along the first airflow path comprises exhausting the airflow into an exhaust enclosure, wherein the exhaust enclosure is coupled to the processing enclosure;
directing the portion of the airflow from the first airflow path comprises drawing the portion of the airflow from the exhaust enclosure through the second airflow path; and
returning the portion of the airflow to the first airflow path comprises returning the portion of the airflow from the second airflow path to the exhaust chamber.

25. The method of claim 20, further comprising sensing a level of contaminant removal from the second airflow path downstream from the second filtration assembly.

\* \* \* \* \*